United States Patent Office 3,002,855
Patented Oct. 3, 1961

3,002,855
METHOD AND COMPOSITION FOR COMBATING SLAG FORMATION ON REFRACTORY SURFACES
James H. Phillips, Western Springs, Donald R. Anderson, Downers Grove, and Franz P. Manlik, Chicago, Ill., assignors to Nalco Chemical Company, a corporation of Delaware
No Drawing. Filed Feb. 1, 1957, Ser. No. 637,629
14 Claims. (Cl. 117—123)

This invention relates to the inhibition or prevention of slag formation on refractory surfaces, more particularly, to a method for combating slag formation and a composition especially adapted therefor.

Slag formation on refractory surfaces is a troublesome and expensive problem in a number of processes where high temperature gases are conducted over the refractories. The problem is especially pronounced in the steel industry, where high temperature furnace effluent gases are conducted over refractory surfaces in the regenerative method of preheating air and possibly the fuel. Like problems arise in similar operations, such as in glass making.

In the steel industry, especially in the open-hearth process, high temperature effluent gases are conducted from the furnace over refractory surfaces, to transfer their heat content to the refractories. The refractories in the succeeding cycle transfer the heat to the air supplied to the furnace for combustion and, at times, to the fuel. The effluent or combustion gases are at a very high temperature corresponding to the steel making operation and reach the refractories at a temperature on the order of two to three thousand degrees Fahrenheit, commonly at about 2200–2500° F.

In the open hearth process, for example, the effluent gases are the result of supplying air and fuel through ports in the furnace and over the hearth, for combustion to provide heat and for reaction of the bath and its components. Materials volatilize into or are entrained as fine particles by the effluent or combustion gases, and much of these materials eventually reaches the regenerative zones, which are commonly filled with open refractory brickwork termed checkers or checker brick. The checkers may be constructed of several kinds of refractory brick, such as fire clay, high alumina, silica, silica-alumina, magnesite and chrome brick. Volatilized and entrained substances deposit from the gases on the surfaces of the checkers and form a tenacious slag which plugs and insulates the checkers. From time to time during the succession of heats in the furnace, checker cleaning methods are employed, such as steam or air lancing, to remove as much as possible of the deposits. Nevertheless, the slag continually builds up until the furnace must be shut down and the checkers dismantled and rebuilt.

The open hearth furnace is commonly constructed with two regenerators, each of which may include two checker chambers. The air, and at times the fuel, is first supplied to the furnace through one regenerator or pair of checkers, is consumed in the combustion process and the combustion gases exit through the other, heating the latter. The flow of air and combustion gases is then reversed, and the air flow is through the heated checkers and to the furnace, and out through the other pair of checkers as combustion gases, to reheat it. As the slag deposits build up in the checkers, gas flow becomes restricted and heat transfer is reduced to a point where the checkers can no longer be used efficiently. At that time, the checkers are dismantled, and they are rebuilt with new bricks and whatever used bricks can be salvaged. For example, as many as 30,000 or even 40,000 bricks may have to be replaced. This is because the slag fuses to the bricks and also fuses the bricks together. The hard fused slag from an open hearth furnace is characterized by having an iron oxide content, calculated as $Fe_2O_3$, of 80% or greater. The following is an analysis of a slag which is typical of the better conditions encountered:

|  | Percent |
|---|---|
| Silica ($SiO_2$) | 1.8 |
| Ferric oxide ($Fe_2O_3$) | 90.0 |
| Calcium oxide (CaO) | 3.4 |
| Magnesium oxide (MgO) | Trace |
| Sodium oxide ($Na_2O$) | 0.3 |
| Zinc oxide (ZnO) | 3.8 |

Thus, the checker slag deposits include metallic oxides and silicates and are usually predominantly various oxides of iron with minor amounts of silica, calcium oxide and zinc oxide. Other materials may also be present.

In its broader aspects, this invention has for its object the reduction of the slag problems associated with the exposure of refractory surfaces to hot gases from which slag-forming materials deposit.

A particular object of the invention is to provide a method for treating the refractories so as to inhibit or minimize the formation of deleterious slag deposits, reducing or preventing the formation of the hard bonded coatings otherwise encountered.

More particularly, it is an object to provide a method of chemically treating the refractories and a composition therefor which favorably influences slag formation, so that the character of the deposits is altered and they are much more readily removed, resulting in savings in the refractory materials.

A further object is to provide the refractories with a coating of materials which prevent or minimize slag formation, and cause the slag deposits to be readily removable, such as by air or steam lancing and/or by a simple physical treatment upon dismantling, which recovers or salvages the refractory articles.

An important object of the invention is to provide a method and composition which inhibits the formation of high temperature metallic oxide deposits, especially those composed of a major proportion of iron oxides.

An additional object is to provide a method which is simply carried out before, and if desired, during operation of the furnace, and which is relatively low in cost.

An important specific object is to provide a method and composition for combating slag formation in the checkers employed in regenerative methods in the steel industry, such as in open-hearth furnaces.

A particular object is to provide a composition of an active compound or slag-inhibiting material and a carrier therefor.

More particularly, it is an object to provide an effective carrier in combination with especially active chromium and aluminum compounds. These and other objects and advantages of the invention will be apparent on reference to the specification.

In a copending application of Donald R. Anderson, Serial Number 637,624, filed February 1, 1957, and now abandoned, the use of compounds of chromium or compounds of aluminum for combating slag formation is disclosed and claimed. In a copending application of Franz P. Manlik, Serial Number 637,638, filed February 1, 1957, the use of the particular combination of chromium and halogen, e.g., chromium halide, is claimed.

It is necessary that the refractory surfaces be covered to a sufficient extent and with an effective amount or concentration of the active compounds disclosed in the foregoing applications. It was found that in applying the materials where the refractory surfaces are inaccessible, such as in checker chambers, large amounts of the relatively expensive chemicals would be required, so that the cost would be high.

In accordance with the present invention, it was discovered that this problem could be overcome successfully by applying the active compounds in intimate mixture with a particular carrier, comprising aluminum oxide.

The problem of slag formation is complex, and a number of materials were found to be unsatisfactory as carrier materials, because they formed hard deposits despite the presence of the active compounds. Aluminum oxide was found to be markedly superior to the other compounds investigated, preserving the effectiveness of the active compounds and without necessity for a large quantity of the latter, and not tending to increase slag formation or attack on the refractories. In fact, the aluminum oxide itself is somewhat active and cooperates in combating slag formation.

The invention thus provides a new composition of a chromium or aluminum salt and aluminum oxide, and a new method for combating slag formation which involves coating refractory surfaces with the composition.

The coat is provided on the refractory surfaces during exposure, thus combating slag formation. Preferably, an initial coat or precoat is applied on the surfaces, after which they are exposed to the hot gases for heat transfer. Preferably also, a coat of the materials is subsequently applied on the surfaces in the course of the exposure to hot gases, i.e., from time to time during operation.

The coat is preferably provided on the refractory surfaces by direct application of a corresponding coating composition to the surfaces, that is, the coating composition is blown or dusted, for example, immediately on the surfaces to furnish an effective coat.

The coating composition is preferably provided in finely divided solid or dust form for application to the refractory surfaces. The finely divided aluminum oxide ingredient may constitute a hydrated form, such as bauxite and other visibly dry hydrated products.

The active chromium or aluminum compound is preferably a chromium or aluminum salt, such as a halide, nitrate, sulfate, or phosphate, as exemplified in the above copending applications. A chromium halide is preferred, or the equivalent combination of chemically combined chromium and chemically combined halogen. The latter composition preferably constitutes a chromium compound and a metallic halide. Another preferred group of salts constitutes the nitrates.

In providing a compound of chromium or aluminum in combination with a metallic halide, various metallic halides or corresponding materials providing the same, which are non-slagging under the conditions may be used, preferably a copper halide. The halides referred to include both the simple halides and other forms, such as mixed salts or compounds, for example, the oxychlorides. A preferred halide is commercial copper oxychloride (having a formula such as $CuCl_2 \cdot 3Cu(OH)_2$ or $3CuO \cdot CuCl_2 3H_2O$). It is preferred to employ at least 10% by weight of the metallic halide, on the basis of the chromium or aluminum compound, and the halide may be employed in a proportion up to that which will provide a stoichiometric quantity of halogen to provide $MX_3$, wherein X represents halogen, with the chromium or aluminum (M) in the composition, or a greater quantity of halide may be provided.

A copper halide is apparently the most advantageous halide. However, other halides such as those of strontium, cobalt and manganese may be substituted in whole or in part. On the other hand, compounds which may contribute to or accelerate harmful fusion and slag formation are not recommended, and thus, iron, calcium, alkali metal and other such halides are not used. Likewise, other materials employed in the invention are non-slag forming under the conditions of operation. Thus, silicates and silica are also avoided, in addition to the foregoing metals.

The coating composition is applied in a thin layer over the exposed refractory surfaces, for example, at a rate of application of 0.001 to 0.01 pound per square foot of surface. The quantities refer to the active materials, i.e., furnishing the chromium or aluminum salt. The quantities are increased according to the proportion of the aluminum oxide carrier. The carrier may be employed in a weight proportion up to about 10 parts per part of active substances, and the carrier is advantageously employed in a ratio to the active materials of about 3 to 10:1. Thus, for example, open-hearth checker chambers containing 40,000 bricks having dimensions of 3" x 4½" x 9" may be coated with 30 to 60 pounds of chromium or aluminum salt, e.g., chromic chloride. One part of the active materials may be blended with about four to five parts of aluminum oxide, and the mixture coated on the bricks during or following assembly of the checkers. After the start of operations, the dry composition can be blown or sprayed into the checkers, in the gas stream entering the checkers from the furnace. This may be done two or three times a week at about the same rate of application, or at a reduced or increased rate as conditions require. The checkers are steam or air lanced about once a week to remove soft and firable materials as far as possible.

In this manner of operation, the active materials, such as chromium halide, are preferably in the form of a fine dust, e.g., less than about 100 mesh (U.S. Sieve Series), for achieving good distribution throughout the checkers. The chromium halide or other material preferably has a minimum water content (free water) to afford free flowing mixtures and minimize caking of the mixtures. The particle size of the aluminum oxide is preferably about the same, passing through a 100 mesh screen.

Slag formation apparently involves eutectic melts and condensation and desublimation mechanisms, resulting in the formation of hard dense deposits on the refractory surfaces. These deposits build up during operation and are only partly removed by normal cleaning technique. Gas flow becomes restricted and heat transfer is reduced, reducing the overall thermal efficiency. Maintenance and brick replacement costs are increased, and the furnaces must be shut down after a period of time corresponding to the buildup of deposits. The objects of the invention are achieved by inhibiting or combating the formation of hard slag on the refractory surfaces, producing soft friable deposits which are removed more readily. The fusion point of the slag is also raised, and the tendency to sinter is reduced. The fusion point is especially significant when a reducing atmosphere is present in the checker bricks. The fusion point of checker slag is low under reducing conditions, while relatively high under oxidizing conditions. The treatment of the invention also does not cause an increase in attack on the refractories.

The efficacy of treatment may be evaluated by several test methods, two of which follow:

TEST METHOD A

Checker bricks, both fire clay and high alumina, are tested with slag and a treatment composition under furnace conditions, to determine hardness of deposit and effect of the composition on the bricks. In this method, the bricks are cut into 1½ inch cubes, and a ½ inch x ¾ inch cavity is drilled in one side of each cube. Checker slag, such as produced in the open-hearth process, is ground and screened to a uniform particle size: through 60 mesh, on 200 mesh (U.S. Sieve Series). A treatment composition is mixed with the slag, and the cavities in the bricks are filled with the mixture.

A metal melting furnace (McEnglevan, Model B 2½) is provided, having a premixed gas and air burner. A furnace gas analyzer is provided (Orsat). The furnace is preheated to the desired temperature, and the gas-air ratio is adjusted to produce the desired furnace atmosphere, oxidizing or reducing. The bricks filled with the mixture are placed in the furnace for a period of time, and are then removed and cooled to room temperature. The deposit resulting from the mixture introduced is tested for hardness, and the cubes are split and examined for penetration of the mixture into the bricks.

TEST METHOD B

A mixture of slag and a treatment composition is treated under furnace conditions, to determine the hardness of the resulting composition, by a crushing test. In this method, the mixture is placed in ceramic tubes (Alundum heating element cores), ⅝ inch I.D. x 1 inch, cemented on a base of Alundum cement. The filled tubes are treated in a furnace as in Method A, and removed and cooled to room temperature.

The sintered mixture is then in the form of a pellet in each tube, which is removed, ground to appropriate size and shape for testing, placed in a crushing machine, and compressed to the breaking point. Results are expressed as crushing strength in pounds per square inch of cross sectional area.

The following examples illlustrate the improved conditions furnished by the invention, but the invention is not limited thereto. The proportions are by weight.

*Example 1*

Open-hearth hot checker slag was ground and then mixed with the treatment compositions identified below. The treatment compositions were prepared by intimately mixing the ingredients in the indicated proportions and heating to drive off the water of crystallization of the chromic chloride. Blank or control samples of slag alone were also tested.

Test Method B was employed at the furnace temperatures and with the samples fired in the furnace for the periods of time specified. The furnace was supplied with natural gas, and the gas-air ratio was set to produce an oxidizing atmosphere.

| Composition of treatment | Crushing Strength, p.s.i. | |
|---|---|---|
| | Weight ratio, carrier: $CrCl_3$ | |
| | 9:1 | 8:2 |
| 2600° F., 2½ hours: | | |
| (a) 40%($Al_2O_3 \cdot 3H_2O$+$CrCl_3$) | 150 | 150 |
| (b) 20%($Al_2O_3 \cdot 3H_2O$+$CrCl_3$) | 900 | 420 |
| (c) 10%($Al_2O_3 \cdot 3H_2O$+$CrCl_3$) | 1,140 | 900 |
| (d) 10%$Al_2O_3 \cdot 3H_2O$ | 2,400 | |
| (e) 40%(Bauxite+$CrCl_3$) | 300 | 240 |
| (f) 20%(Bauxite+$CrCl_3$) | 990 | 480 |
| (g) 10%(Bauxite+$CrCl_3$) | 1,320 | 1,290 |
| (h) 10% Bauxite | 2,500 | |
| Control slag | ¹ above 2,700 | |
| 2350° F., 16 hours: | | |
| (a) 40%($Al_2O_3 \cdot 3H_2O$+$CrCl_3$) | 120 | 120 |
| (b) 20%($Al_2O_3 \cdot 3H_2O$+$CrCl_3$) | 420 | 270 |
| (c) 10%($Al_2O_3 \cdot 3H_2O$+$CrCl_3$) | 750 | 570 |
| (d) 10¼ $Al_2O_3 \cdot 3H_2O$ | 1,050 | |
| (e) 40%(Bauxite+$CrCl_3$) | 150 | 150 |
| (f) 20%(Bauxite+$CrCl_3$) | 450 | 390 |
| (g) 10%(Bauxite+$CrCl_3$) | 810 | 750 |
| (h) 10% Bauxite | 1,350 | |
| Control Slag | ¹ above 2,700 | |

¹ Exceeded capacity of apparatus.

Test Method A with the above conditions showed that the treatment compositions of chromic chloride and aluminum oxide or bauxite, mixed with slag did not attack high alumina or fire clay checker bricks.

In like manner, chromic nitrate and aluminum nitrate may be substituted for chromic chloride in the above compositions.

*Example 2*

The fusion temperatures of treated and untreated slag in a reducing atmosphere were compared:

| | Temperature, ° F. | |
|---|---|---|
| | Initial Deformation | Fusion |
| Slag | 2,515 | 2,530 |
| Slag+5% $Al_2O_3$ | 2,540 | 2,535 |

The invention thus provides improvements in the protection of refractory materials and in furnace operations. It is of course most advantageous to coat or cover the refractory surfaces as completely as possible, but even where complete coverage cannot be secured for some reason, partial coating of the surfaces is advantageous. The best results are apparently obtained when the refractory surfaces are initially coated or precoated, and the subsequent periodic application of the composition or renewal of the coat contributes to the most effective inhibition of slag formation. The invention is especially adapted for application to regenerative gas preheating in pyrochemical processes such as open-hearth and smelting operations in the steel industry, and it finds other applications as well.

The invention is hereby claimed as follows:

1. The method for combating slag formation on refractory surfaces exposed to hot gases from which slag-forming materials deposit thereon, which comprises providing on said surfaces a coat of a composition containing 1 part by weight of a non-slagging salt of a metal of the group consisting of chromium and aluminum, and 3–10 parts by weight of aluminum oxide, and contacting the coated refractory surfaces with said hot gases from which slag-forming materials deposit.

2. A method as in claim 1 wherein the non-slagging salt is an aluminum halide.

3. A method as in claim 1 wherein the non-slagging salt is a chromium halide.

4. The method for combating slag formation on refractory surfaces exposed to hot gases from which slag-forming materials deposit thereon, which comprises providing on said surfaces a coat of a composition containing one part by weight of chemically combined chromium and chemically combined halogen and 3–10 parts by weight of aluminum oxide, and contacting the coated refractory surfaces with said hot gases from which slag-forming materials deposit.

5. The method for combating slag formation on refractory surfaces exposed to hot gases from which slag-forming materials deposit thereon, which comprises providing on said surfaces a coat of a composition containing one part by weight of a chromium compound and a non-slagging metallic halide and 3–10 parts by weight of aluminum oxide, and contacting the coated refractory surfaces with said hot gases from which slag-forming materials deposit.

6. The method for combating slag formation on refractory surfaces exposed to hot gases from which slag-forming materials deposit thereon, which comprises providing on said surfaces a coat of a composition containing one part by weight of chromic chloride and 3–10 parts by weight of aluminum oxide, and contacting the coated refractory surfaces with said hot gases from which slag-forming materials deposit.

7. The method for combating slag formation on refractory surfaces exposed to hot gases from which slag-forming materials deposit thereon, which comprises providing on said surfaces a coat of a composition containing one part by weight of chromic nitrate and 3–10 parts by weight of aluminum oxide, and contacting the coated refractory surfaces with said hot gases from which slag-forming materials deposit.

8. The method for combating slag formation on refractory surfaces exposed to hot gases from which slag-forming materials deposit thereon, which comprises providing on said surfaces a coat of a composition containing one part by weight of aluminum nitrate and 3-10 parts by weight of aluminum oxide, and contacting the coated refractory surfaces with said hot gases from which slag-forming materials deposit.

9. A slag-combating composition adapted for introduction into regenerative checker brickwork and coating the brickwork therewith, which consists essentially of 1 part by weight of a non-slagging salt of a metal of the group consisting of chromium and aluminum, and 3-10 parts by weight of aluminum oxide.

10. A slag-combating composition adapted for introduction into regenerative checker brickwork and coating the brickwork therewith, which consists essentially of 1 part by weight of chromium nitrate and 3-10 parts by weight of aluminum oxide.

11. A slag-combating composition adapted for introduction into regenerative checker brickwork and coating the brickwork therewith, which consists essentially of 1 part by weight of aluminum nitrate and 3-10 parts by weight of aluminum oxide.

12. A slag-combating composition adapted for introduction into regenerative checker brickwork and coating the brickwork therewith, which consists essentially of chemically combined chromium and chemically combined halogen in proportions providing 1 part by weight of chromium halide, and 3-10 parts by weight of aluminum oxide.

13. A slag-combating composition adapted for introduction into regenerative checker brickwork and coating the brickwork therewith, which consists essentially of 1 part by weight of chromium halide and 3-10 parts by weight of aluminum oxide.

14. A slag-combating composition adapted for introduction into regenerative checker brickwork and coating the brickwork therewith, which consists essentially of a dry intimate mixture of 1 part by weight of chromic chloride and 3-10 parts by weight of aluminum oxide.

References Cited in the file of this patent

UNITED STATES PATENTS

| | | |
|---|---|---|
| 2,218,584 | McDougal et al. | Oct. 22, 1940 |
| 2,369,709 | Baumann et al. | Feb. 20, 1945 |
| 2,413,441 | Feichter | Dec. 31, 1946 |
| 2,534,327 | Whitman | Dec. 19, 1950 |
| 2,612,442 | Goetzel | Sept. 30, 1952 |
| 2,935,956 | Welch | May 10, 1960 |

FOREIGN PATENTS

| | | |
|---|---|---|
| 693,292 | Great Britain | June 24, 1953 |

UNITED STATES PATENT OFFICE
CERTIFICATE OF CORRECTION

Patent No. 3,002,855 October 3, 1961

James H. Phillips et al.

It is hereby certified that error appears in the above numbered patent requiring correction and that the said Letters Patent should read as corrected below.

Column 3, line 7, for "unsatisfactorpy" read -- unsatisfactory --; column 5, in the table, column 1, line 15 thereof, for " 10¼" read -- 10% --.

Signed and sealed this 10th day of April 1962.

(SEAL)
Attest:

ERNEST W. SWIDER
Attesting Officer

DAVID L. LADD
Commissioner of Patents